(12) United States Patent
Lowe-Wylde (10) Patent No.: US 7,617,741 B1
(45) Date of Patent: Nov. 17, 2009

(54) WIND TURBINE TESTING

(75) Inventor: Gregory Lowe-Wylde, Oshawa (CA)

(73) Assignee: Robert Vanderhye, McLean, VA (US)

( * ) Notice: Subject to any disclaimer, the term of this patent is extended or adjusted under 35 U.S.C. 154(b) by 0 days.

(21) Appl. No.: 11/898,943

(22) Filed: Sep. 18, 2007

Related U.S. Application Data (60) Provisional application No. 60/845,521, filed on Sep. 19, 2006, provisional application No. 60/851,305, filed on Oct. 13, 2006.

(51) Int. Cl.
*G01L 3/02* (2006.01)

(52) U.S. Cl. .................................. 73/862.29

(58) Field of Classification Search .............. 73/862.29
See application file for complete search history.

(56) References Cited

U.S. PATENT DOCUMENTS

| | | | | |
|---|---|---|---|---|
| 5,225,712 | A * | 7/1993 | Erdman | 290/44 |
| 6,083,382 | A * | 7/2000 | Bird | 210/96.2 |
| 6,840,734 | B2 * | 1/2005 | Hansen | 415/1 |
| 6,847,128 | B2 | 1/2005 | Mikhail et al. | |
| 7,042,110 | B2 | 5/2006 | Mikhail et al. | |
| 7,059,833 | B2 | 6/2006 | Stiesdal et al. | |
| 7,075,192 | B2 * | 7/2006 | Bywaters et al. | 290/55 |
| 7,231,282 | B2 * | 6/2007 | Schubert et al. | 700/287 |
| 7,303,373 | B2 * | 12/2007 | Viertl | 416/1 |
| 2003/0185665 | A1 * | 10/2003 | Hansen | 415/1 |
| 2006/0273595 | A1 * | 12/2006 | Avagliano et al. | 290/44 |
| 2007/0097565 | A1 * | 5/2007 | Oohara et al. | 361/20 |
| 2007/0104582 | A1 * | 5/2007 | Rahai et al. | 416/197 A |
| 2007/0220790 | A1 * | 9/2007 | Wagter | 40/218 |
| 2008/0042441 | A1 * | 2/2008 | Kabatzke | 290/44 |

OTHER PUBLICATIONS

Camporeale et al; "Automatic System for Wind Turbine Testing"; Journal of Solar Engineering; Nov. 2001; vol. 123, pp. 333-338.
Gipe, Wind Power; (C) 2004, Chelsea Green Publishing; pp. 57-69.
Dunnett et al; Small Wind Systems for Battery Charging; ITDG publication, Jul. 2001; pp. 1, 21-23.
Aliprantis et al; "Modeling and control of a variable speed wind turbine . . . "; Conf. on Elect. Mach., Helsinki, Finland,pp. 558-562; 2000.
www.indmeas.co/uk/resources/torquehistory.pdf; two pages; admitted prior art.
www.magtrol.com; "Torque Transducers"; one page; admitted prior art.

* cited by examiner

*Primary Examiner*—Max Noori (57) ABSTRACT

A system and method provide for the effective, real, testing of a wind turbine, especially a vertical axis wind turbine, in a simple, versatile, durable, and relatively cost effective manner. The shaft of a wind turbine (e.g. a VAWT such as a Savonius) is connected to a disc, as is a proportionally controlled disc brake. A torque transducer is connected to the shaft, and an rpm sensor, and a device which collects torque and rpm data from the torque transducer and sensor, are provided. The torque transducer and rpm sensor may be a rotary torque transducer, or the torque transducer may be a load cell operatively positioned a known distant X from the turbine shaft, which known distance X is input into the device which collects torque and rpm data. By effectively applying loads to the proportional disc brake at determined wind speeds, a power curve for the wind turbine can be generated.

20 Claims, 9 Drawing Sheets

WIND TURBINE TESTING

CROSS REFERENCE TO RELATED APPLICATIONS

This application is based upon provisional applications 60/845,521 filed Sep. 19, 2006 and 60/851,305 filed Oct. 13, 2006, the disclosures of which are incorporated by reference herein.

BACKGROUND AND SUMMARY OF THE INVENTION

It is important for many reasons to be able to accurately determine the torque of a wind turbine, such as a vertical axis wind turbine (VAWT) like a Savonius. Torque testing is necessary to properly design a permanent magnet generator to be used with the wind turbine, and to develop a power curve, to determine expected annual electricity (or other measure) production, and/or performance ratings for the wind turbine. [See *Wind Power* by Paul Gipe, ©2004, Chelsea Green Publishing Company, pp. 57-69, incorporated by reference herein]. This is especially true for VAWTs and particularly primarily drag VAWTs such as of the Savonius type since little information exists about torque values or accurate testing procedures. Because of this typically "The power curves proffered by some manufacturers of small turbines can best be characterized as informed guesswork" [*Wind Power*, page 62].

According to the present invention, methods and systems are provided for accurately determining the torque in various wind speeds of wind turbines. While the invention is not restricted to VAWTs, it is especially useful for use with VAWTs, particularly primarily drag VAWTs like the Savonius and helical types, which have high torque but low rpm so that conventional permanent magnet generators are commonly not available for use therewith, but have to be specifically designed. The improved Savonius type wind turbines such as illustrated and described in published US Patent application No. US 2006/0153682, and co-pending U.S. patent application Ser. No. 11/265,278 filed Nov. 3, 2005 (both incorporated by reference herein), are particularly suitable for use in the practice of the present invention.

The systems and methods according to the invention typically have the advantages of simplicity, versatility, durability, and relative cost effectiveness compared to the prior art (e.g. see *Automatic System for Wind Turbine Testing*, Camporeale et al, Journal of Solar Energy Engineering, 2001, Vol. 123, part 4, pages 333-338, incorporated by reference herein).

According to one aspect of the present invention, there is provided a wind turbine testing system comprising: A wind turbine shaft. A disc operatively connected to the shaft. A proportionally controlled disc brake operatively connected to the disc. A torque transducer operatively connected to the shaft. An rpm sensor; and a device which collects torque and rpm data from the torque transducer and sensor. The system may further comprise a wind speed sensor operatively connected to the device which collects torque and rpm data, the device correlating wind speed to the torque and rpm data. The wind turbine shaft is desirably operatively connected to a vertical axis wind turbine. The system may also further comprise a second, parking, electrically controlled disc brake operatively connected to the disc. The disc brakes are desirably electric/hydraulic brakes.

The system may also further comprise an electrically actuated clutch operatively connected to the wind turbine shaft and a load, and a device operatively connected to a wind speed sensor which operates the clutch to connect the shaft to the load when the wind speed exceeds a predetermined value. The torque transducer and rpm sensor may comprise a rotary torque transducer. Alternatively, the torque transducer comprises a load cell operatively positioned a known distant X from the turbine shaft, which known distance X is input into the device which collects torque and rpm data.

According to another aspect of the invention, there is provided a wind turbine system comprising: a vertical axis wind turbine having a substantially vertical shaft; a disc operatively connected to the shaft; a parking disc brake operatively connected to the disc; and a proportionally controlled disc brake operatively connected to the disc. The system also preferably includes a torque transducer operatively connected to the shaft, and a device which collects rpm and torque data associated with the shaft. The torque transducer may comprise a load cell operatively positioned a known distant X from the turbine shaft, which known distance X is input into the device which collects torque and rpm data. An electrically actuated clutch, such as described above, may be operatively connected to the wind turbine shaft and a load.

According to another aspect of the invention, there is provided a wind turbine testing system for a vertical axis wind turbine having a substantially vertical shaft, comprising a computer controlled dynamometer operatively connected to the wind turbine substantially vertical shaft.

The invention also relates to a wind turbine testing system for a wind turbine having a shaft, comprising: a proportional controlled brake operatively connected to the shaft; a computer controller; a signal amplifier operatively connected to the controller; and a proportional electric actuator operatively connected to the amplifier and brake.

Also according to the invention there is provided a method of obtaining torque and other data utilizing a system such as described above. The method comprises: a) operating the proportional brake to decrease and increase the braking pressure from about 100% to about 0% and to about 100% while substantially continuously recording wind speed, torque, and rpm. The method may further comprise, prior to a), b) determining if the wind speed is over x mph and less than y mph where y is at least 10 mph more than x, and x is at most 12 mph, before practicing a). Also, where the shaft is connected through an electrically actuated clutch to a load, the method still further comprises actuating the clutch to operatively connect the shaft to the load if the wind speed is determined to be more than y during the practice of b). Also, desirably a) is practiced to decrease the pressure until the rpm of the shaft substantially stops increasing, then increasing the pressure until the rpm is substantially zero, until the maximum power point for a given wind speed is reached.

According to yet another aspect of the invention there is provided a method of operating a wind turbine comprising a) periodically testing the wind turbine to determine maximum power points for a particular wind speed, and b) while not practicing a) operating the wind turbine to power a load. In this way testing interferes only minimally with operation.

The invention also relates to a wind turbine testing system having a turbine and a loading device, and a device which functions as a torque transducer operationally in between the turbine and loading device that allows one to smoothly control the loading from no load to a load causing essentially zero rpm, the system having sufficient power absorbing capacity, smooth operation at low rotational speed, providing the load independent of rotational speed, and sufficient braking torque.

The device in between the turbine and the loading device, for a vertical axis wind turbine, may comprise: A substantially vertical wind turbine shaft. A load cell. A disc operatively connected to the shaft for rotation therewith; and a device operatively connected to the disc and abutting the load cell so that the device prevents rotation of the brake by applying a force to the load cell. Alternatively, a rotary torque transducer may be provided between the turbine and loading device.

The invention also includes a vertical axis wind turbine comprising: a substantially vertical wind turbine shaft; a disc operatively connected to the shaft for rotation therewith; a proportionally controlled disc brake operatively associated with the disc and mounted so that the brake may spin with the shaft, or be stopped in spinning; a load cell; and a device operatively connected to the disc and abutting the load cell so that the device prevents rotation of the brake by applying a force to the load cell.

It is the primary objective of the present invention to provide effective, real, testing of a wind turbine, especially a vertical axis wind turbine, in a simple, versatile, durable, and relatively cost effective manner. This and other objects of the invention will become clear from the detailed description of the invention, and from the appended claims.

DETAILED DESCRIPTION OF THE DRAWINGS

Figure 1:
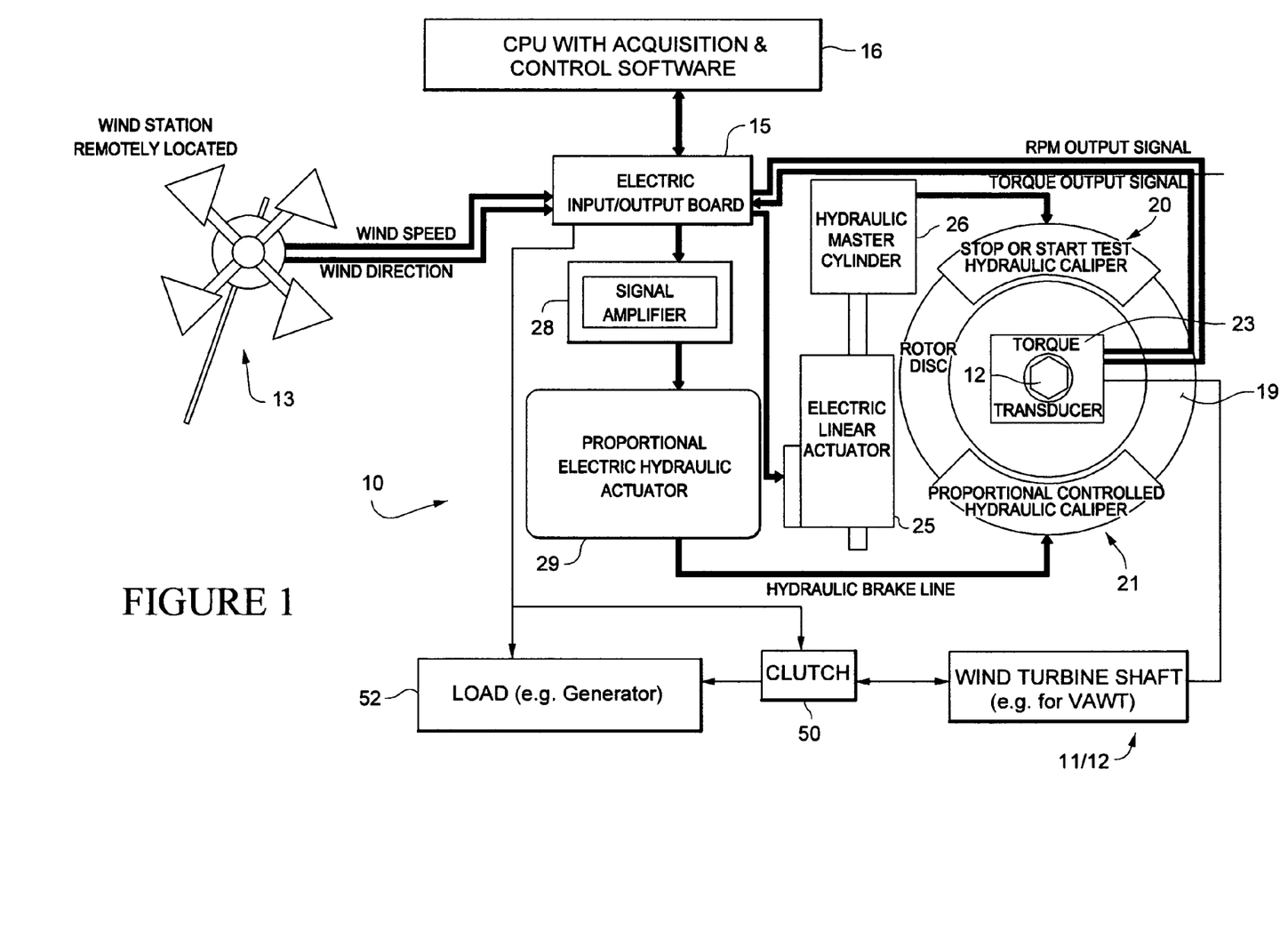
FIG. 1 is a schematic illustration of an exemplary wind turbine testing system according to the invention.

FIG. 1 is a schematic illustration of an exemplary system 10 according to the present invention. The system 10 is associated with, and operatively connected to, a shaft 12 of a wind turbine 11, in this case the vertical shaft of a VAWT such as described in the above-mentioned published and pending applications. The system 10 receives input from a conventional anemometer or wind station 13 which is typically positioned remotely from the turbine 11, but close enough so that the wind speed and directional information from the anemometer or wind station 13 accurately reflects the wind received by the wind turbine. If the site where the wind turbine is to be utilized has a very distinct prevailing wind, the apparatus 13 preferably is placed upwind of the wind turbine in that prevailing wind direction.

The sensing apparatus 13 provides wind speed (and preferably direction) data to a conventional electric input/output board 15 operatively connected to a CPU 16 with acquisition and control software. Through the board 15 the CPU 16 controls at least one, and preferably two, disc brakes operatively connected to turbine shaft 12, and receives rpm and torque data from a torque transducer 17 operatively connected to the shaft 12.

In the embodiment illustrated in FIG. 1, the wind turbine (e.g. vertical) shaft 12 has a rotor/disc 19 operatively connected to it for rotation therewith. Operatively mounted with respect to the disc 19 by any suitable mechanisms (such as stationary brackets or housings) are one or more disc brakes, preferably in the form of electrically controlled but hydraulically actuated calipers. In the embodiment illustrated in FIG. 1, there is a first disc brake 20 which stops, or allows starting, of rotation of the shaft 12, hereinafter referred to as the "parking brake". The parking brake 20 does not require power when in the "on" position (holding the disc 19 stationary). There is also a second disc brake 21 which can be proportionally controlled to apply a variable amount of retarding pressure/force on/to the disc 19 and thus the shaft 12. The brake 21 is hereinafter referred to as the "variable brake".

The brakes 20, 21 may have a wide variety of designs and configurations. One particularly desirable type is that used as a conventional trailer brake, with an electrically controlled hydraulic actuator. One exemplary (only) model is a Dexter electric/hydraulic disc brake actuator such as K71-651-00, viewable at www.dexteraxle.com. Others include any electric/hydraulic units with small hydraulic pumps and proportional valves to adjust the pressure output of the brake.

Also operatively connected to the wind turbine shaft 12 is a torque transducer 23. While the torque transducer 23 may be of any suitable conventional type (including but not limited to phase displacement, differential transformer, strain gauge, surface acoustic wave, or magneto-elastic types), for accuracy yet simplicity and relatively low cost, preferably a rotary load cell [such as the Futek TRS 300, viewable at www.futek.com] is used as the torque transducer 23. The transducer 23 sends shaft 12 torque and rpm output signals, as schematically illustrated in FIG. 1, to the board 15 and CPU 16.

In the embodiment illustrated in FIG. 1, the board 15 and CPU 16 control an electric linear actuator 25, which in turn controls/moves a master hydraulic cylinder 26 which turns the parking brake 20 on and off. When on, the brake 20 locks the disc 19 so that there can be substantially no movement of the shaft 12. When off, the brake 20 allows substantially free movement of the disc 19 and shaft 12.

The board 15 and CPU 16 also control the variable brake 21, e.g. through a conventional signal amplifier 28 and conventional proportional electric/hydraulic actuator 29, as illustrated schematically in FIG. 1. By varying the pressure applied by the brake 21 on the disc 19, the brake 21 controls the rotation of the shaft 12 to allow appropriate measurements to be taken. Ideally, the pressure of brake 21 on disc 19 would be controlled to provide determination of the maximum power output of the wind turbine 11 for a particular wind speed.

The system 10 may be used in a wide variety of procedures for determining torque, and/or a power curve, for the wind turbine 11 of which the shaft 12 is part. The simplest way is manual control. Another simple way is using a simple on/off schedule for the brake 21 using a first pre-determined pre-set brake force percentage until satisfactory wind conditions have been recorded. Then the brake force of variable brake 21 is changed to a second pre-determined brake force percentage and testing proceeds again until satisfactory wind conditions have been recorded. This procedure is repeated until there is sufficient testing to determine a power curve, or for other purposes.

A slightly more complicated method for using the system 10 which should allow almost complete automatic control yet obtains accurate data is to start a gradual braking decrease/increase from about 100% to about 0% back to about 100%. As long as wind speed, torque, and rpm are substantially continuously recorded while proportional braking is being applied by variable brake 21, one should be able to obtain a useable power curve. Averaging of the power points will typically be necessary to take into account the momentum/inertia effect of the wind turbine connected to shaft 12 while the turbine is accelerating or decelerating. Averaging during both acceleration (braking force decreasing) and deceleration (braking force increase) should properly account for the inertia effect. Obviously the longer the time period over which the method may be practiced, the more data points there will be, and the more accurate the results.

Figure 2:
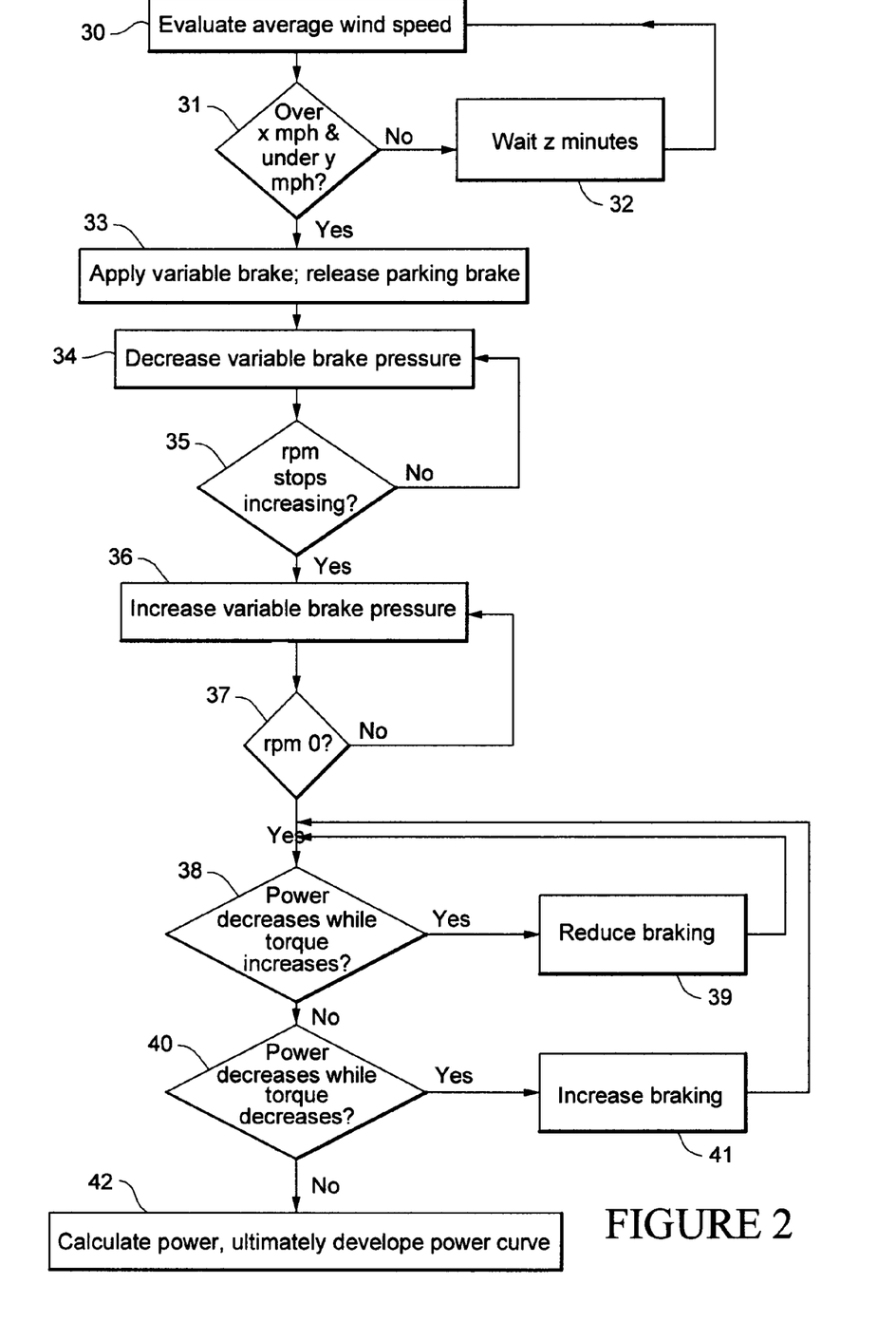
FIG. 2 is a high level flow chart of an exemplary procedure for utilizing the system of FIG. 1.

One exemplary manner of automatically controlling the system 10 as generally described in the previous paragraph, is best seen by viewing the high level flow chart of FIG. 2. The high level flow chart of FIG. 2 may be used by any experienced programmer to produce the control software in the CPU 17 (the acquisition software is conventional and at most would need only modest modifications to be suitable for use in the system of FIG. 1).

As illustrated by box 30 in FIG. 2, one evaluates average wind speed using data from apparatus 13. Wind direction may also be utilized in a more complex version, with wind speed correlated to wind direction for a number of different quadrants or segments, for example to determine a number of different power curves to see if they are different, and to help properly position the turbine 11 on a particular site if they are.

Since the most useful data may be obtained when the wind is between certain minimum and maximum speeds, preferably a decision box 31 determines if the wind speed from apparatus 13 is over x mph and under y mph. For example x may be 5 mph and y 30 mph, or x 8 mph and y 40 mph, depending upon the particular wind turbine 11, site, and other factors. If the wind speed determined at 31 is over x mph & under y mph, that is "Yes"—then the procedure continues; if "No" one waits z minutes (see box 32, e.g. 0.5-2 minutes) then returns to 30.

The continued procedure illustrated at 33 is to apply variable brake 21, and release parking brake 20. As illustrated at 34, the variable brake pressure applied by brake 21 to disc 19 is then varied, and at decision box 35 rpm is evaluated. A determination is made about whether rpm has substantially stopped increasing? If "Yes"—continue; if "No"—go back to 34.

In the continued procedure, as illustrated by box 36, the variable brake 21 pressure is increased. As indicated by decision box 37, it is determined if rpm is about zero? If "Yes"—continue; if "No"—go back to 36.

In the continued procedure, as illustrated by decision box 38, it is determined if power decreases while torque increases? If "Yes"—reduce braking (as indicated at 39) by 21, then return to the start of 38; if "No"—continue.

In the continued procedure, as illustrated by decision box 40, it is determined if power decreases while torque decreases? If "Yes"—increase braking (as indicated at 41) by 21, then return to the start of 38; if "No"—continue.

In the continued procedure, as illustrated by box 42, the maximum power at a particular wind speed has been determined. This is then a data point used by the acquisition software in the CPU 16. Ultimately this information may be used to determine a power curve, or for a wide variety of other purposes (e.g. as described in the *Wind Power* Gipe book referenced above).

As many other data points as desirable are determined after 42. One may wait a predetermined period of time (e.g. one minute, ten minutes, one hour, etc.), and then start at 30 again, ad infinitum, until the necessary data points are obtained. The amount of time one waits may depend upon how long the brake 21 needs to cool properly, and/or on other factors.

Figure 3:
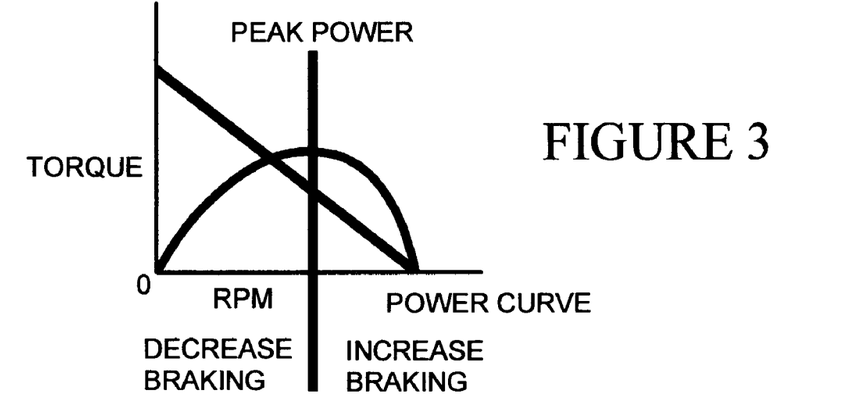
FIG. 3 is a graph where torque is plotted against rpm to schematically illustrate when peak power is achieved using the increasing and decreasing braking procedure of FIG. 2.

A conventional power curve for a wind turbine is power plotted on the y-axis versus wind speed on the x-axis. Another type of power curve is illustrated by the schematic graph of FIG. 3 where torque is plotted against rpm to schematically illustrate when peak power is achieved using the increasing and decreasing braking procedure of FIG. 2. The peak power point from FIG. 3 is the data point used by the acquisition software in CPU 16.

Figure 4:
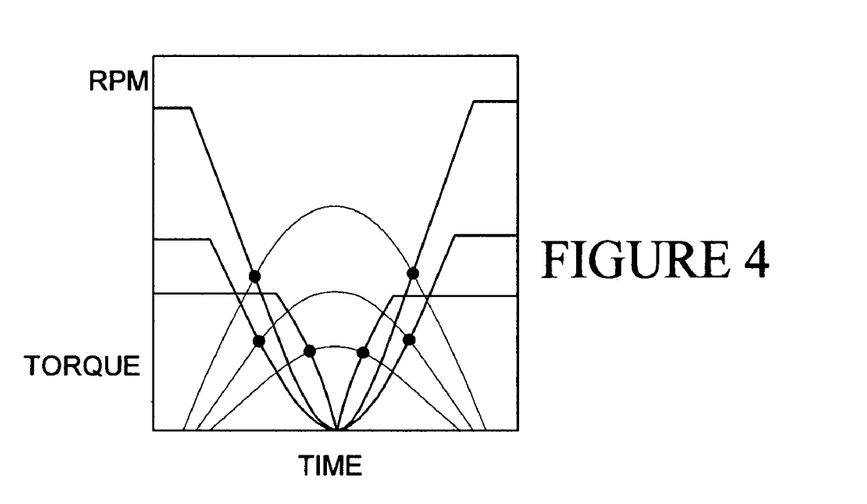
FIG. 4 is a schematic graphical representation of another type of power curve obtained by practicing the procedure of FIG. 2 where torque and rpm are separately plotted on the y-axis, and time on the x-axis.

FIG. 4 is a schematic graphical representation of another type obtained practicing the procedure of FIG. 2. Torque and rpm are separately plotted on the y-axis, and time on the x-axis, in FIG. 4. The dots in FIG. 4 are the maximum power points.

One of the purposes of the decision box 31 in FIG. 2 is to protect the wind turbine 11 from damage if the wind speed is too high since typically the procedure of FIG. 2 is practiced without a load on the wind turbine. However, if the wind turbine is to be operated at high wind speed during use, then it may be desirable to set the value of y very high, or not use an upper value at all. In these circumstances, one can protect the wind turbine 11 by operating the clutch 50 (see FIG. 1) under control of the board 15 and CPU 16 to connect a load 52 to the shaft 12 if the wind speed sensed at 13 reaches a certain level. The clutch 50 may be an electric clutch, or a pneumatic or hydraulic clutch with an electric actuator. The load 52 may be a generator connected to the grid, or a secondary load such as one or more fans, pumps, electric resistance elements, halogen light bulbs, or the like.

Even if a relatively low level of y (e.g. 25-30 mph) in decision box 31 is used, there may be another purpose for the apparatus 50, 52 Since the system 10 and procedure of FIG. 2 may be utilized in situ at a real turbine operating location (as opposed to just in a wind tunnel or laboratory environment), and since the brake 21 cannot be used even substantially continuously since it needs time to cool and/or since testing may not be desirable during the entire time the system 10 is utilized with the wind turbine 11, the clutch 50 and load 52 may be utilized to actually perform a useful function while the system 10 is not in use. That is, the wind turbine 11 may actually generate useable electricity, pump water, blow air, or perform a number of other functions, under the control of elements 15, 16, when the system 10 is not in use.

Figure 5:
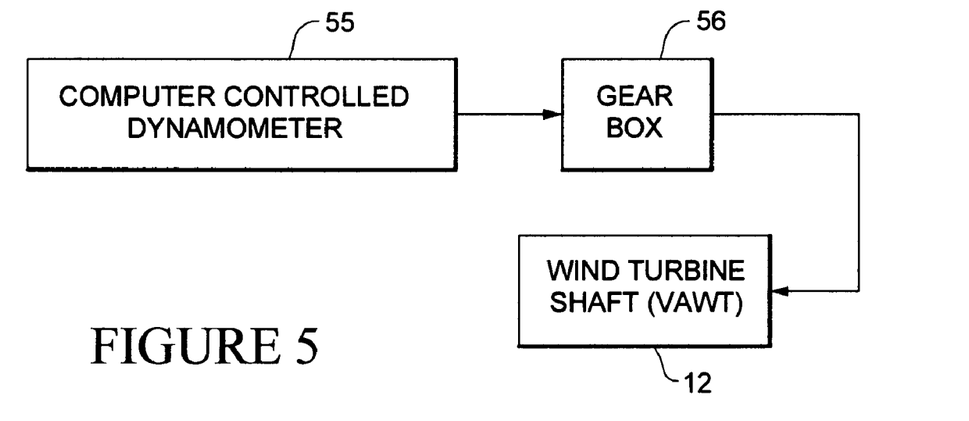
FIG. 5 is a schematic illustration of an alternative system performing substantially the same end function as the system of FIG. 1.

While the system 10 is a desirable system because of its simplicity, versatility, durability, and relative cost effectiveness compared to the prior art, a more expensive system can be utilized to accomplish the same end result. FIG. 5 provides a schematic illustration of such a system. A conventional computer controlled dynamometer 55 comprises the main component of the system. The computer controlled dynamometer 55 includes a torque transducer (e.g. with non-contact differential transformer torque measuring technology), telemetry system, associated displays, software, and a computer controller. One example of such a system is the Magtrol 4 PB 15 system with controller, viewable at www.magtrol.com. For a VAWT, the computer controlled dynamometer 55 needs to be mounted at 90 degrees to the shaft 12, operatively connected thereto through a gear box 56 (e.g. with 1:1 bevel gears) or the like.

Figure 6:
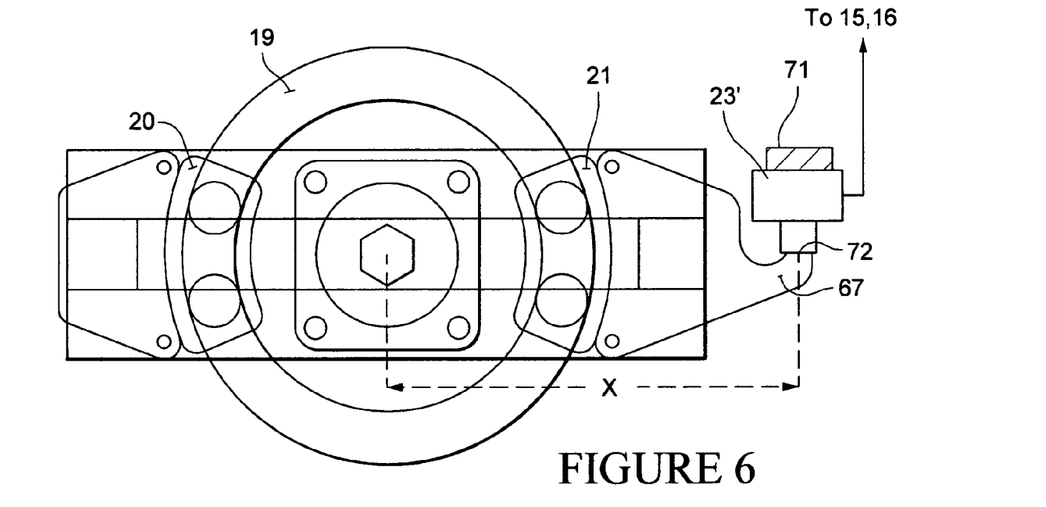
FIGS. 6 & 7 are top and side schematic views, respectively, of one exemplary manner of providing cooperation between a stationary load cell and a wind turbine shaft so that the load cell essentially functions as a torque transducer as an alternative to the torque transducer aspect of the FIG. 1 system.
Figure 7:
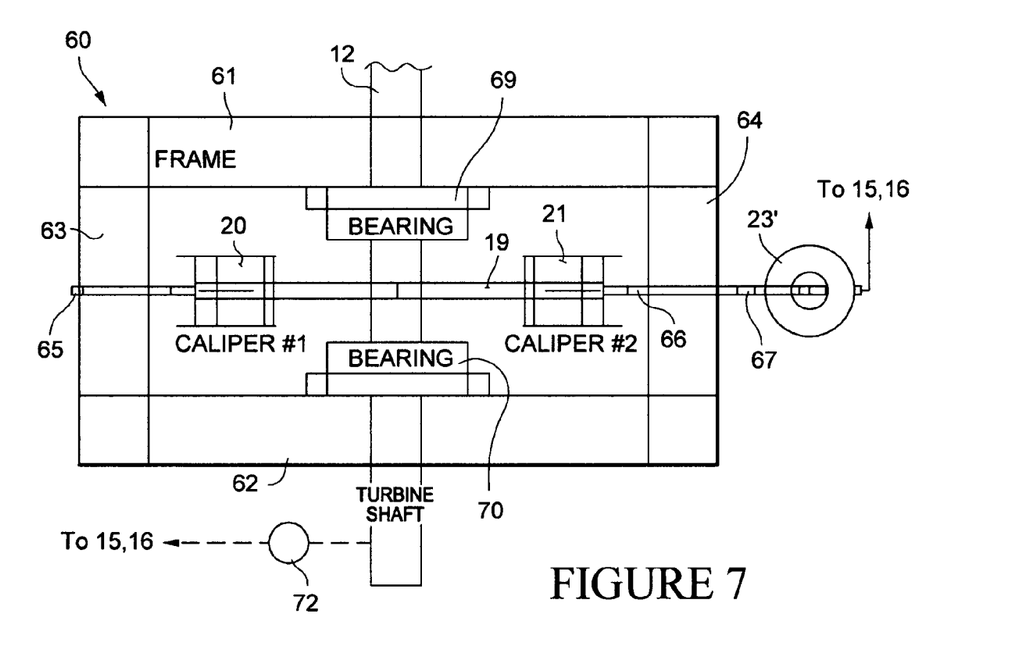

Another system according to the invention, similar to but likely less expensive and simpler than, the FIG. 1 embodiment is illustrated at 10' in FIGS. 6 & 7. Components substantially identical to those in the FIG. 1 embodiment are shown by the same reference numerals. The brake and electrical control components are not shown in FIGS. 6 & 7 but are substantially identical to those in FIG. 1.

In the system 10' the brake calipers 20, 21 are mounted so that they move with a frame 60. The frame 60 may have any suitable construction, which may include top and bottom portions 61, 62, respectively, and side portions 63, 64. Plates 65, 66 may securely connect the brakes 20, 21, respectively, to the frame side portions 63, 64 by any suitable mechanism (e.g. welding, fasteners, etc.). The plate 66 has an arm portion 67 which extends outwardly from the rest of the frame 60, and engages a conventional load cell 23'. The frame 60 is mounted to the turbine shaft 12 by hex bore bearings 69, 70, or like bearings.

The load cell 23' is stationary with respect to the shaft 12, and may be mounted in that manner by any conventional device (shown only schematically at 71 in FIG. 6) suitable for that function. So that the load cell 23' can essentially act as a torque transducer, the distance X (see FIG. 6) from the axis of rotation of the shaft 12 to the operative point of contact 72 of the arm 67 with the load cell 23' must be precisely known, and that value X input into the CPU 16. It is desirable to make the value X a simple whole integer, depending upon the units that the torque will be calculated in. For example if the torque is to be expressed as foot pounds, it is desirable to make X substantially exactly 1 foot, or 2 feet, etc.

The necessary essentially exact value X may be most easily achieved by machining the arm 67—or at least the contact point 72 thereof—after the frame 60 is constructed, but before the bearings 69, 70 are slid onto the turbine shaft 12. The frame 60 may then be mounted on the shaft 12 via bearings 69, 70, and the distance X checked to see that it is correct. Then the brake disc 19—which is already in position with respect to the calipers 20, 21—can be fixed to the shaft 12 for positive rotation therewith.

In operation of the embodiment of FIGS. 6 & 7, the entire frame 60, with calipers 20, 21 thereon, has a tendency to spin with the shaft 12 and disc 19. However, since the arm 67 contact point 72 abuts the load cell 23', the frame 60 cannot rotate. When practicing the procedure of FIG. 2, then, the load cell 23' will register the force at each point in time applied by the arm 67. This value, in electronic form, is then transmitted to the components 15, 16 and used—with the value of X input into the CPU 16—to calculate the torque. A separate sensor 74—such as a conventional rpm sensor, shown only schematically in FIG. 7—will transmit a simultaneous rpm signal to the components 15, 16.

Thus in the FIGS. 6 & 7 embodiment the load cell 23', given the value X input into CPU 16 and a torque calculation utilizing the same, essentially functions as a simple torque transducer. The load cell 23' is much less expensive than the rotary torque transducer 23 in FIG. 1, and the entire system 10' should have a lower build height and be simpler in general.

When the appropriate data points are obtained, using any of the systems described above, they are utilized in conventional equations and mathematical operations to produce any desired final output. One such formula is the conventional wind power formula $P=0.5\,\rho A v^3$ where—in consistent units—P is power, $\rho$ is air density, A is the swept area of the turbine rotor, and v is the velocity of the wind. The final output may be a conventional power curve, and/or raw torque and rpm data useful to design a permanent magnet generator specifically useful for the particular wind turbine 11 being tested.

While the described apparatus is particularly desirable, the invention covers any system with a device that can function as a torque transducer, and operationally in between the turbine and loading device, that allows one to smoothly control the loading from no load to a load causing essentially zero rpm. The system must have enough power absorbing capacity, be smooth at low rotational speed, the load independent of rotational speed, and enough braking torque.

Figure 8:
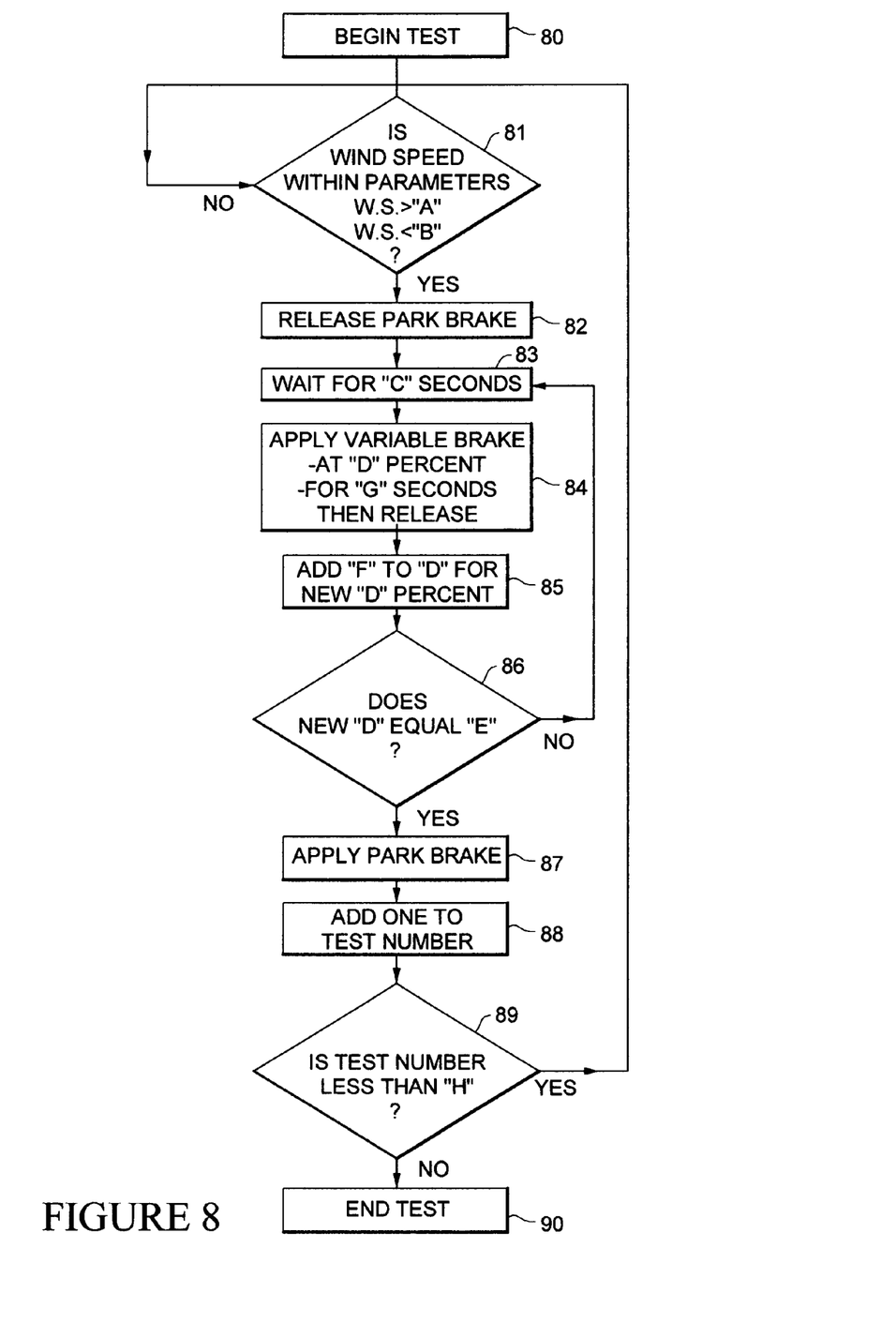
FIG. 8 is a high level flow sheet like that of FIG. 2 showing a modified form of operation.

An alternative to the procedure of FIG. 2 is illustrated in FIG. 8. In FIG. 8 the minimum test wind speed is A, the maximum B. The wait time is C. The start brake force percent is D, finish is E percent, and the incremetal increase in brake force is F percent. The brake test time is G, and the number of tests to run is H.

The test is begun as indicated at 80 in FIG. 8, and if the result of decision box 81 is "Yes" then the parking brake is released as indicated at 82. After a wait of C seconds (83), variable pressure is applied to the brake (84) at D % for G seconds, then released. F % is added to D % for G seconds, as indicated at 85. Decision box 86 evaluates if the new D is equal to E, and if the result is "Yes", then the parking brake is applied as indicated at 87. If the result at 86 is "No", then the procedure returns to box 83.

After 87, "one" is added to the test number (88). Then if the result of the evaluation in decision box 89 is "Yes", then the procedure returns to decision box 81; if the result is "No", then the test is ended (90).

The procedures set forth in FIGS. 2 & 8 may be considered "open loop" testing, in which the testing proceeds sequentially. Under some circumstances it is desirable to call the testing routine at fixed time intervals and using a computer. e.g. with a Windows® operating system, where in the sequence is determined. In this situation, the system of FIG. 9 is desired.

Figure 9:
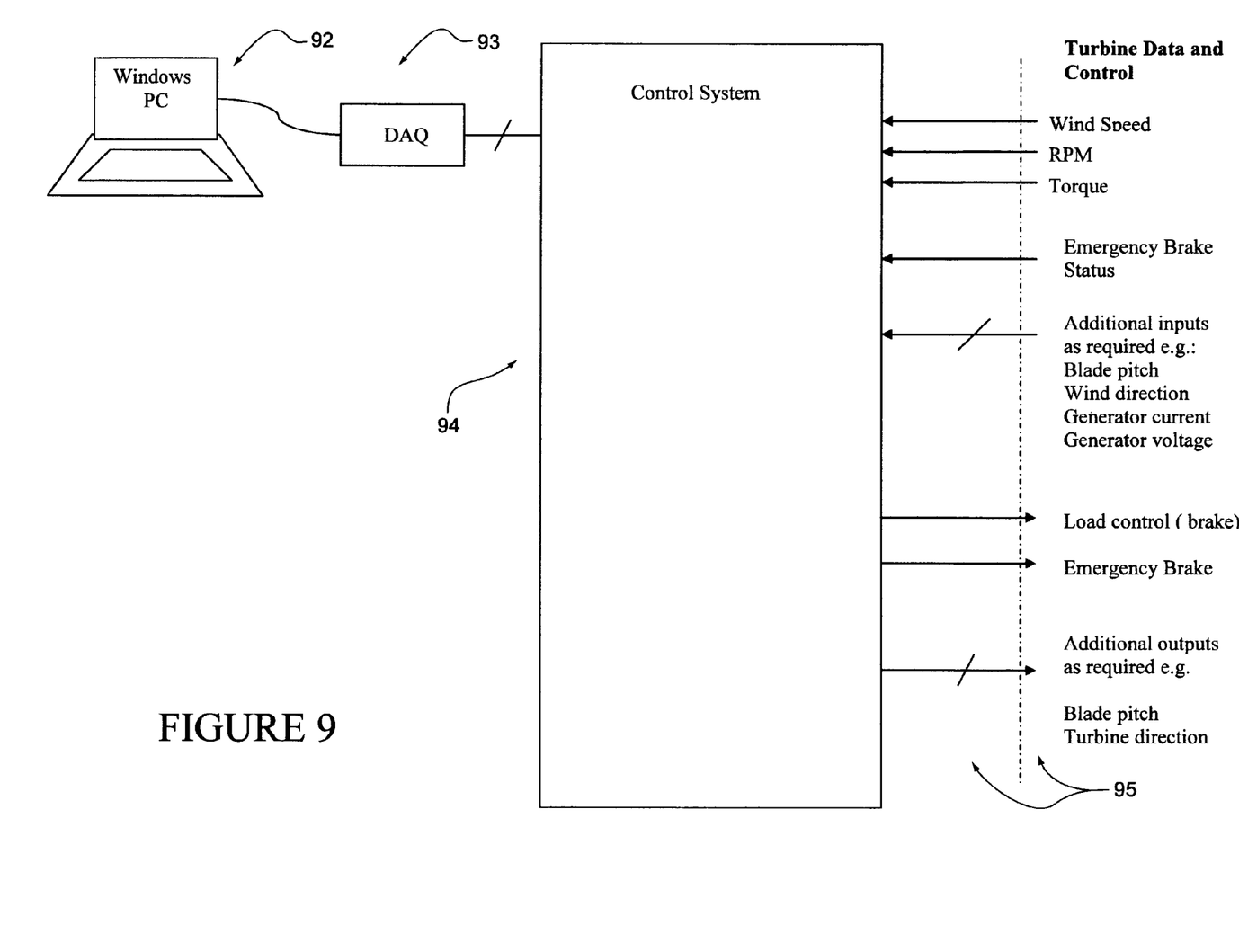
FIG. 9 is a schematic illustration of yet another type of wind turbine testing system according to the invention.

FIG. 9 illustrates a PC 92 with a Windows® operating system running a GUI to permit control of the testing and log the data. A Data Acquisition Card 93 converts both digital and analog data between the PC 92 and the control system 94. The control system 94 connects the DAQ 93 inputs and outputs to sensors and actuators associated with the wind turbine being tested. A microcontroller in the control system 94 permits real time control of the turbine, which the PC 92 could not provide. The system 94 also includes a failsafe for the emergency (parking) brake in case the PC 92 or GUI fails. The turbine data and control inputs and outputs are schematically illustrated at 95 in FIG. 9.

Figure 10:
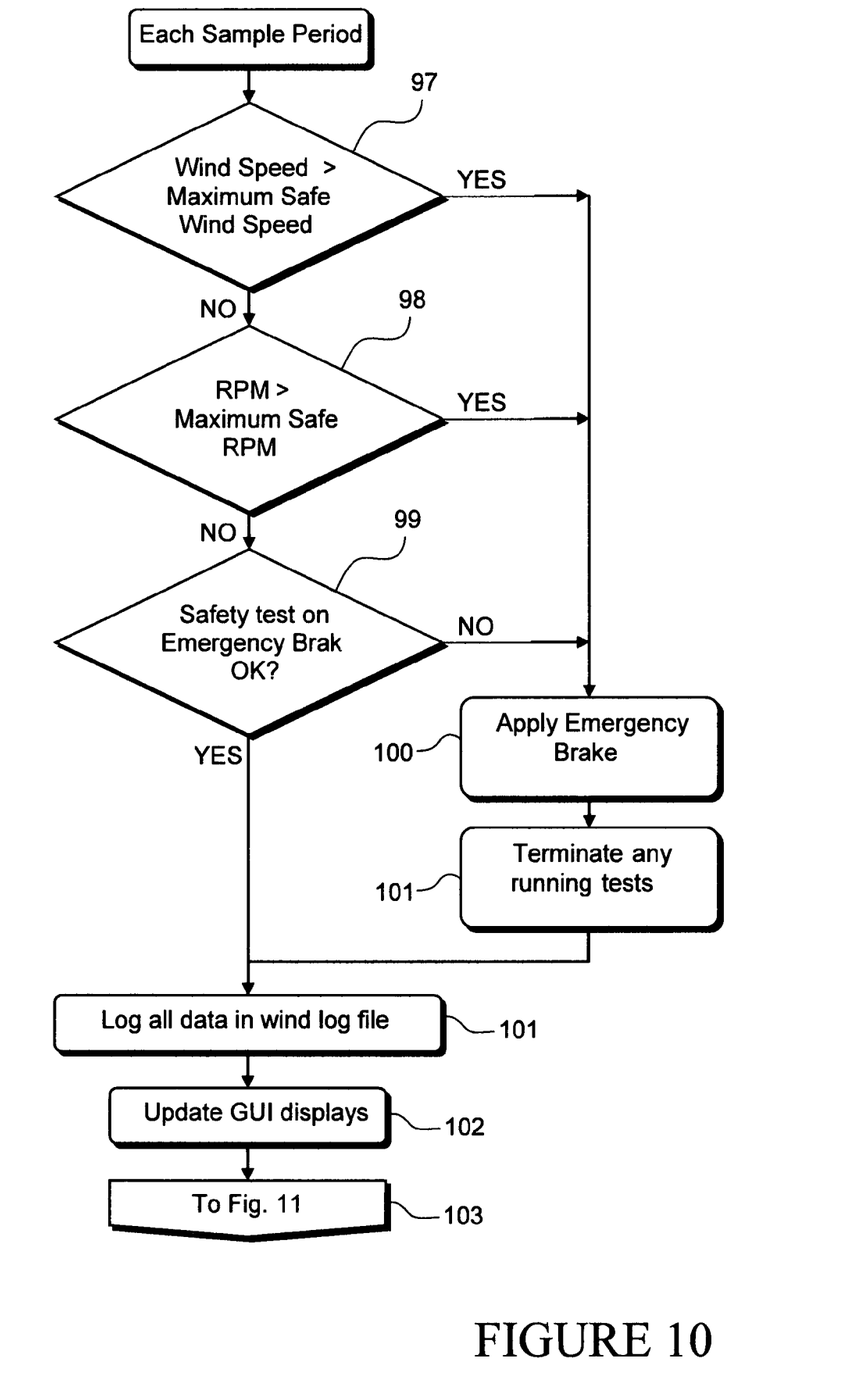
FIGS. 10 & 11 are a high level flow sheet of an exemplary operation of the system of FIG. 9.
Figure 11:
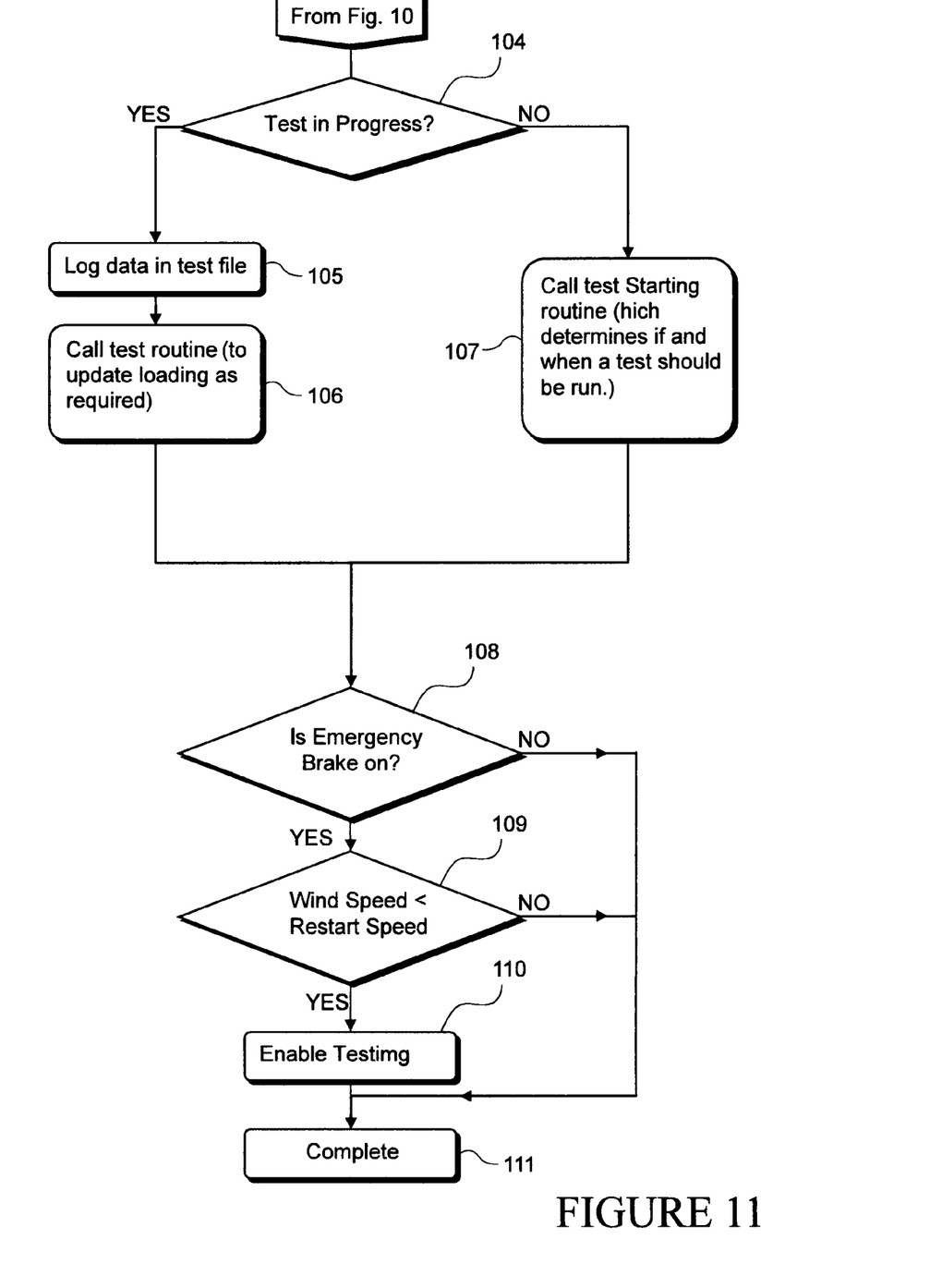

FIGS. 10 & 11 schematically illustrate, in high level flow sheet form, an exemplary manner of using the equipment of FIG. 9 to perform effective wind turbine testing. For each sample period in decision box 97 whether the wind speed is greater than the maximum safe wind speed is evaluated, and if the result is "no" then in decision box 98 the evaluation is made if the rpm is greater than the maximum safe rpm. If "no" is the result in 98, then in decision box 99 it is determined if the parking brake is functioning properly. If "no" is the result in 99—or "yes" is the result in 97 or 98, then the parking brake is applied at 100, and any running tests are terminated as indicated at 101. If the result from box 99 is "yes", then all the data is logged in the wind log file as indicated at 102, and the GUI displays are undated, as indicated at 103.

As indicated in FIG. 11, after updating of the displays at 103, whether there is a test in progress is determined in decision box 104. If "yes" then data is logged in the test file (105), and the test routine is called (106) to update loading as required. If the result in decision box 104 is "no", as indicated at 107 a test starting routine is called, which determines if and when a test should be run.

Whether the emergency (parking) brake is on is evaluated in decision box 108 after either 106 or 107; if the result is "yes" then decision box 109 determines if the wind speed is less than the restart speed. If the result from 109 is "yes", then testing is enabled, as indicated at 110, and completed as indicated at 111. If the results from decision boxes 108, 109 are "no", then the flow also proceeds to 111.

Figure 12:
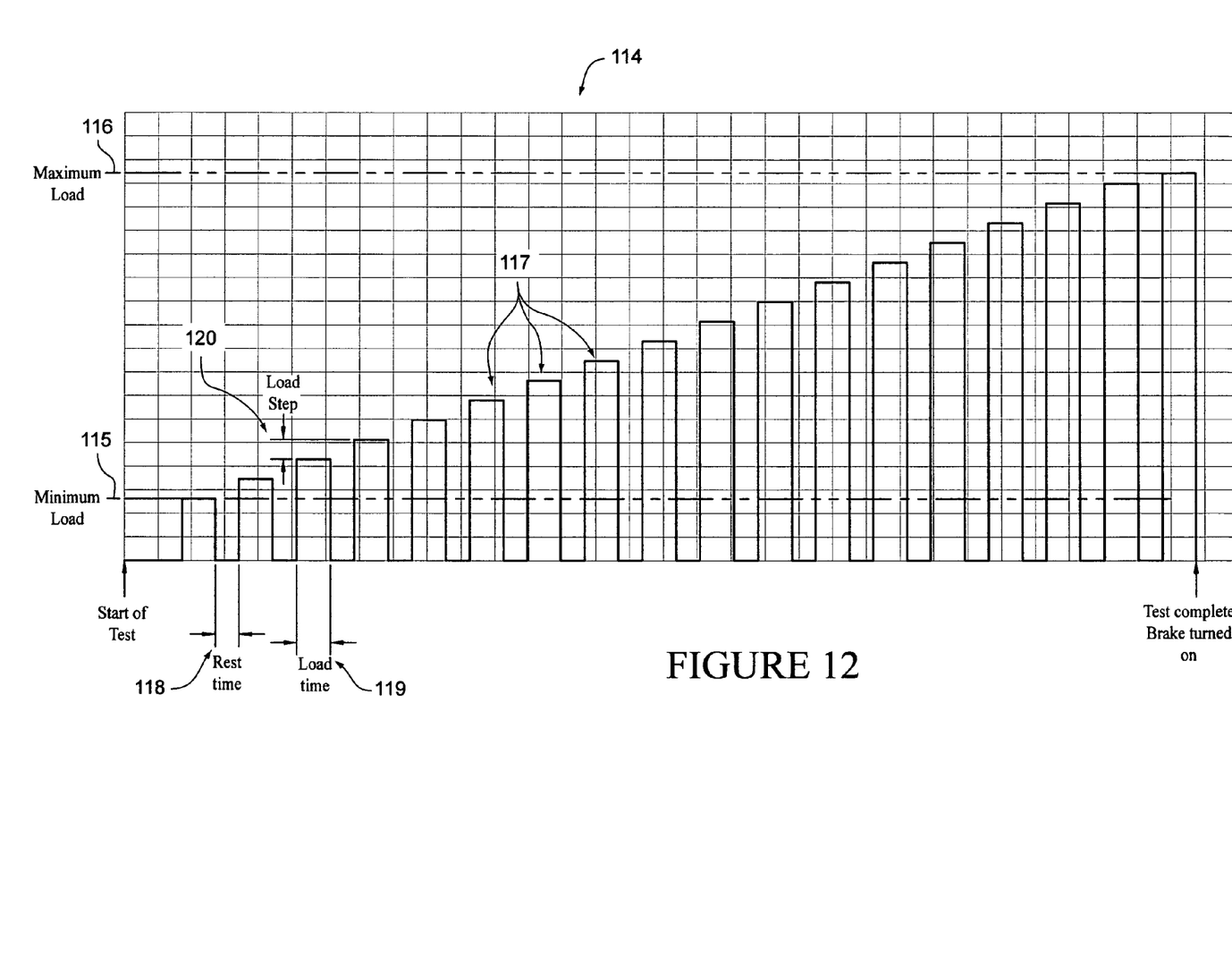
FIG. 12 is a bar graph showing application of a plurality of steps to provide schematically a staircase load function, in the utilization of the system of FIG. 9.

The step load graph 114 of FIG. 12 shows the functionality of the system of FIG. 9 and the procedures of FIGS. 10 & 11 in a simplistic manner. The minimum load is indicated by line 115, and the maximum load by line 116, with the steps 117 in between, with a substantially constant load step differential indicated at 120. The (optional) rest times 118, and the load times 119, respectively, are also preferably substantially constant, and along with the load step 120 are set by the GUI (graphical user interface) prior to the start. At the start of the test the parking brake is turned off. No load is applied for a "spooling time" to allow the turbine to spool up. After that, the staircase of loads 117 is applied until the maximum load is reached.

The term "operatively connected" or the like as used herein means, as it normally does, any connection, association, or relationship between the components described that allows them to function as designed. All narrower ranges within any broad range given herein are also specifically included. The claims are to be interpreted as broadly as allowed by the prior art, and to encompass all equivalent systems and procedures.

What is claimed is:

1. A wind turbine testing system comprising: a wind turbine shaft; a disc operatively connected to the shaft; a proportionally controlled disc brake operatively connected to the disc; a torque transducer operatively connected to the shaft; an rpm sensor; and a device which collects torque and rpm data from the torque transducer and sensor.

2. A wind turbine testing system as recited in claim 1 further comprising a wind speed sensor operatively connected to the device which collects torque and rpm data, the device correlating wind speed to the torque and rpm data.

3. A wind turbine testing system as recited in claim 1 wherein the wind turbine shaft is operatively connected to a Savonius vertical axis wind turbine.

4. A wind turbine testing system as recited in claim 1 further comprising a second, parking, electrically controlled disc brake operatively connected to the disc.

5. A wind turbine testing system as recited in claim 4 wherein the disc brakes are electric/hydraulic brakes.

6. A wind turbine testing system as recited in claim 1 further comprising an electrically actuated clutch operatively connected to the wind turbine shaft and a load.

7. A wind turbine testing system as recited in claim 6 further comprising a device operatively connected to a wind speed sensor which operates the clutch to connect the shaft to the load when the wind speed exceeds a predetermined value.

8. A wind turbine testing system as recited in claim 1 wherein the torque transducer and rpm sensor are provided by a rotary torque transducer.

9. A wind turbine testing system as recited in claim 1 wherein the torque transducer comprises a load cell operatively positioned a known distance X from the turbine shaft, which known distance X is input into the device which collects torque and rpm data.

10. A wind turbine system comprising: a vertical axis wind turbine having a substantially vertical shaft; a disc operatively connected to the shaft; a parking disc brake operatively connected to the disc; and a proportionally controlled disc brake operatively connected to the disc.

11. A wind turbine system as recited in claim 10 further comprising a torque transducer operatively connected to the shaft.

12. A wind turbine system as recited in claim 10 further comprising a device which collects rpm and torque data associated with the shaft; and wherein the torque transducer comprises a load cell operatively positioned a known distance X from the turbine shaft, which known distance X is input into the device which collects torque and rpm data.

13. A wind turbine system as in claim 12 further comprising an electrically actuated clutch operatively connected to the wind turbine shaft and a load; and a device operatively connected to a wind speed sensor which operates the clutch to connect the shaft to the load when the wind sped exceeds a predetermined value.

14. A wind turbine testing system for a vertical axis wind turbine having a substantially vertical shaft, comprising: a computer controlled dynamometer operatively connected to the wind turbine substantially vertical shaft, a computer controlled dynamometer including a torque transducer and telemetry system.

15. A wind turbine testing system for a wind turbine having a shaft, comprising: a proportional controlled brake operatively connected to the shaft; a computer controller; a signal amplifier operatively connected to the controller; and a proportional electric actuator operatively connected to the amplifier and brake.

16. A method of obtaining torque and other data utilizing the system of claim 10 comprising: a) operating the proportional brake to decrease and increase the braking pressure from about 100% to about 0% and to about 100% while substantially continuously recording wind speed, torque, and rpm.

17. A method as recited in claim 16 further comprising, prior to a), b) determining if the wind speed is over x mph and less than y mph where y is at least 10 mph more than x, and x is at most 12 mph, before practicing a); and wherein a) is practiced to decrease the pressure until the rpm of the shaft substantially stops increasing, then increasing the pressure until the rpm is substantially zero, until the maximum power point for a given wind speed is reached.

18. A method of operating a wind turbine comprising a) periodically testing the wind turbine to determine maximum power points for a particular wind speed, and b) while not practicing a) operating the wind turbine to power a load.

19. A wind turbine testing system having a vertical axis wind turbine with a substantially vertical shaft; a loading device; and a device which functions as a torque transducer operationally in between the turbine and loading device and comprising: a load cell, a disc operatively connected to the shaft for rotation therewith, and a device operatively connected to the disc and abutting the load cell so that the device prevents rotation of the disc by applying a force to the load cell.

20. A method as recited in claim 16 wherein a) is practiced periodically to test the wind turbine to determine maximum power points for a particular wind speed; and further comprising b), while not practicing a), operating the wind turbine to power a load.

* * * * *

UNITED STATES PATENT AND TRADEMARK OFFICE
CERTIFICATE OF CORRECTION

| | |
|---|---|
| PATENT NO. | : 7,617,741 B1 |
| APPLICATION NO. | : 11/898943 |
| DATED | : November 17, 2009 |
| INVENTOR(S) | : Gregory Lowe-Wylde, Brendon Nunes and Robert Vanderhye |

It is certified that error appears in the above-identified patent and that said Letters Patent is hereby corrected as shown below:

On the Title Page, Item (75) should read:
(75) Inventors: Gregory Lowe-Wylde, Oshawa (CA), Brendon Nunes, Ajax (CA), Robert Vanderhye, McLean, Virginia (US)

Signed and Sealed this

Twenty-ninth Day of December, 2009

David J. Kappos
*Director of the United States Patent and Trademark Office*